United States Patent Office 2,823,508
Patented Feb. 18, 1958

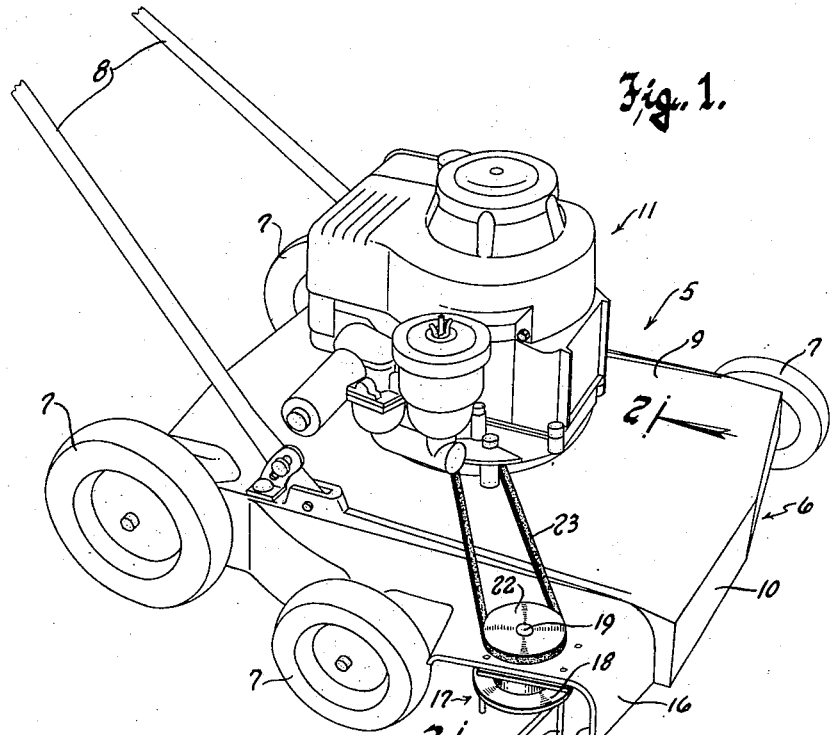
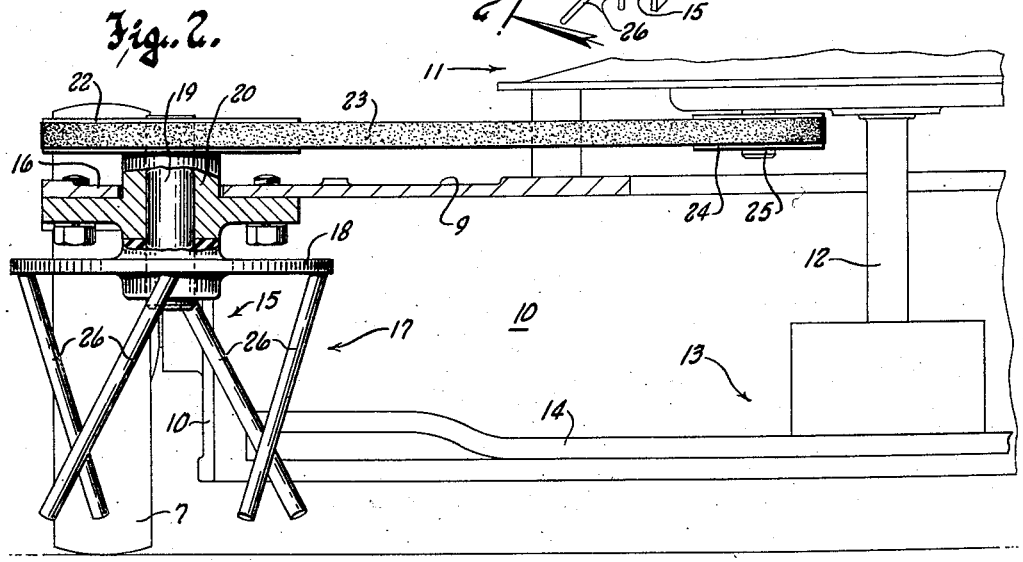

2,823,508

GUARD AND CLEANER FOR CLIPPING OUTLET OF ROTARY MOWER

Hugh S. Brown, Wauwatosa, Wis., assignor to Briggs & Stratton Corp., Milwaukee, Wis., a corporation of Wisconsin Application November 19, 1956, Serial No. 622,965

6 Claims. (Cl. 56—25.4)

This invention relates to power lawn mowers of the type having a cutting element which rotates on a substantially vertical axis, and refers more particularly to a guard for the grass clipping discharge outlet of such lawn mowers.

So called rotary power lawn mowers wherein the cutting element rotates on a vertical axis have enjoyed widespread popularity because of their simplicity, efficiency and low cost. A rotary lawn mower, as is well known, comprises a wheeled carriage having a deck or platform on which is mounted a power drive means, such as an internal combustion engine, and beneath which is mounted a cutting element coaxially connected with the output shaft of the drive means and comprising a plurality of radially extending blades. Depending from the deck or platform of the carriage is a skirt which surrounds the cutting element and which ordinarily has an outlet at one side thereof leading to a discharge chute through which grass clippings are discharged or expelled when the mower is in operation.

The skirt surrounding the cutting element not only serves to prevent grass clippings from being thrown outwardly in all directions by the rapidly rotating blades but also serves as a guard which prevents inadvertent contact with the cutting element. However, the discharge outlet in the skirt and the chute leading therefrom must have a substantial size to accommodate the stream of grass clippings being discharged, and is ordinarily large enough for a person's hand or foot to be inserted thereinto.

Hence, a serious safety problem arises in connection with such rotary mowers for, despite its generous proportions the discharge outlet sometimes becomes clogged with an accumulation of grass clippings. Such an accumulation is readily visible to the operator, who can also see that a slight prod or push will dislodge the grass clippings, and who is therefore tempted to effect clearing of the discharge outlet while the cutting element is rotating. Because the outer edges of the blades sweep very close to the mouth of the outlet in their orbit, such an attempt to dislodge grass clipping accumulations may result in serious injury to a person what attempts to clear the outlet in this manner.

It is therefore an object of this invention to provide means in a rotary power lawn mower of the character described for automatically dislodging accumulations of grass clippings from the discharge outlet of the carriage skirt, which means also serves as a guard or barrier to discourage or prevent insertion of a person's hand or foot into the outlet where it may encounter the rotating cutting element.

Another object of this invention resides in the provision, in a rotary power lawn mower of the character described, of a guard which substantially blocks the discharge outlet in the carriage skirt so as to prevent large objects from being thrown outwardly therethrough, and also prevents objects from being pushed inwardly through the outlet, while at the same time permitting—and even encouraging—expulsion of grass clippings from the outlet.

Still another object of this invention resides in the provision of a guard of the character described, for the discharge outlet of a rotary power lawn mower, which guard may be inexpensively formed from any suitable material including substantially resilient plastic material, may be installed without the necessity for making major modifications in existing rotary lawn mower design or construction, and rotates in such a manner as to discourage any person from inserting anything into the discharge outlet of the lawn mower carriage skirt, and, moreover, deflects away from the cutting element any foreign object inserted into the outlet.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of a physical embodiment of the invention constructed according to the best mode so far devised for the practical application of the principles thereof, and in which:

Figure 1 is a fragmentary perspective view of a rotary power lawn mower embodying the combined guard and cleaner of this invention, the machine being viewed from above and to one side thereof; and Figure 2 is an enlarged fragmentary sectional view taken generally on the plane of the line 2—2 in Figure 1.

Referring now more particularly to the accompanying drawing, the numeral 5 designates generally a rotary power lawn mower of the type to which this invention is particularly applicable, and which comprises a carriage designated generally by 6 mounted for forward movement on wheels 7 and which may be pushed and guided for such movement by means of a handle 8.

The carriage comprises a substantially planar deck or platform 9 having a dependent skirt 10. Mounted on the deck is a power drive means 11, which in this instance is shown as an internal combustion engine, but which, as is well known, may also comprise an electric motor; and mounted beneath the deck, coaxially with the engine crankshaft 12 and drivingly connected therewith, is a rotary cutting element 13. The cutting element comprises a pair of coplanar blades 14 projecting radially outwardly from the vertically disposed axis of the cutting element, and the skirt 10 of the carriage surrounds the blades to serve as a guard and as a deflector of grass clippings and of any larger and heavier objects, such as stones and sticks, which might be picked up and thrown outwardly by the blades as they rotate.

To permit expulsion of grass clippings from inside the skirt, the skirt has an outlet 15 therein which is ordinarily located at one side of the carriage, eccentrically disposed relative to the cutting element, and which may open to a short discharge chute 16.

While the outlet 15 must have substantial size in order to permit the expulsion of grass clippings from the interior of the skirt, it must not be so large that the skirt fails to provide a satisfactory guard for the cutting element. It sometimes happens, therefore, that the outlet, and more particularly the discharge chute 16 leading therefrom, becomes clogged with an accumulation of grass clippings, even though the aperture is large enough for a person to insert his hand or foot therethrough. To overcome this problem and eliminate the danger of a person attempting to manually clear the discharge opening while the mower is in operation, the present invention provides a novel barrier 17 across the mouth of the outlet, which not only discourages any attempt to insert a hand or foot into the outlet but which in fact deflects outwardly and downwardly away from the cutting element any foreign object that may be so inserted, and which, moreover, maintains the outlet and discharge chute leading therefrom, clear of accumulations of grass clippings.

Specifically, the barrier 17 comprises a rotor having a substantially disc-like body portion 18 and a plurality of circumferentially spaced fingers 26 depending therefrom. The body portion 18 is fixed to a shaft 19 which is journaled in a bearing 20 carried by the carriage deck adjacent to the outlet 15 or by the top wall of the discharge chute 16. The barrier is thus mounted for rotation on a substantially vertical axis, and it is connected with the power drive means to be driven in one direction of rotation, as by means of a pulley 22 fixed to the upper end of the shaft 19 and a belt 23 trained around this pulley and around a drive pulley 24 fixed to the cam shaft power takeoff 25 of the engine. Preferably the driven pulley 22 is at least twice the diameter of the drive pulley 24.

The disc-like body portion 18 of the rotary barrier is disposed above the plane of the cutting element blades, and the fingers 26 project angularly downwardly at circumferentially spaced intervals around the body at an inclination opposite to the direction in which the barrier rotates. The length of the fingers 26 is such that they project a substantial distance below the plane of the cutting element blades. The cross-sectional shape of the fingers is not critical, but should be free of sharp corners or edges; and though the fingers normally would be made of metal, they can be formed of substantially resilient material such as nylon or some other suitable plastic, so that they will yield slightly and thus afford additional assurance against injury in the event a person inadvertently inserts his hand or foot into the orbit of the rotating fingers. Obviously the rotor, comprising the disc-like body and the fingers projecting therefrom, may be assembled from separate parts or it may be formed as a single casting.

It will be seen that any accumulation of grass clippings which might tend to lodge in the outlet 15 or its discharge chute 16, will not only be shaken loose by successive impingement of the fingers 26 therewith as the rotor revolves, but will also be driven downwardly by the fingers by reason of their inclination. Because of the speed reduction obtained by the difference in pulley sizes and the fact that the drive is taken from the engine camshaft, rotor speed will be sufficiently low so that the fingers 26 will be clearly visible and will tend to discourage, by their presence, any attempt to insert a hand or a stick of wood or the like into the outlet aperture.

Moreover, should any foreign object be presented to the rotating barrier, the fingers 26, by reason of their inclination, will deflect or cam it downwardly and outwardly away from the orbit of the cutting element. It has also been found that when a heavy object such as a stick or stone is picked up by the cutting element and thrown outwardly toward the outlet, such an object is usually intercepted by the barrier of this invention, so that it can not fly out and cause injury to nearby persons or property.

From the foregoing description taken together with the accompanying drawing it will be apparent that this invention provides a simple, highly effective barrier or guard for the discharge chute or outlet in the carriage skirt of a rotary power lawn mower, which barrier or guard not only prevents inadvertent insertion of foreign objects into the orbit of the rotary cutting element, but also dislodges accumulations of grass clippings which may collect in the outlet or its discharge chute and tends to prevent heavy objects from being thrown outwardly from the mower by the rotating cutting element.

What is claimed as my invention is:

1. In a lawn mower of the type comprising a cutting element rotatable on a vertical axis, power drive means for the cutting element, and a wheeled carriage having a deck beneath which the cutting element is mounted and a skirt surrounding the cutting element and having an outlet at one side thereof through which grass clippings may be expelled, means for preventing clogging of said outlet with grass clippings and for preventing a person from contacting the cutting element through said outlet, said means comprising: a rotor journaled on the carriage adjacent to said outlet, said rotor having a plurality of circumferentially spaced apart fingers forming a barrier across the outlet; and transmission means providing a driving connection between the drive means and said rotor to drive the rotor.

2. In a lawn mower comprising a cutting element rotatable on a vertical axis, power drive means for the cutting element, and a wheeled carriage having a deck beneath which the cutting element is mounted and a skirt surrounding the cutting element and having an outlet at one side thereof through which grass clippings may be expelled, means for preventing clogging of the outlet with accumulations of grass clippings, said means comprising: a rotor having a disc-like body portion mounted on the carriage adjacent to the outlet for rotation on a substantially vertical axis; means drivingly connecting said rotor with the power drive means for rotation in one direction; and a plurality of circumferentially spaced apart fingers on said disc-like body portion of the rotor projecting angularly downwardly therefrom and inclined away from the direction of rotation of the rotor so that an object pushed into the outlet toward the cutting element will be deflected by said fingers downwardly and outwardly away from the cutting element, and so that accumulations of grass in the outlet will be dislodged by the fingers.

3. In a lawn mower comprising a cutting element rotatable on a vertical axis, power drive means for the cutting element, and a wheeled carriage having a deck beneath which the cutting element is mounted and a skirt surrounding the cutting element and having an outlet at one side thereof through which grass clippings may be expelled, means for preventing clogging of the outlet with accumulations of grass clippings, said means comprising: a rotor body; means on the carriage journaling said rotor body for rotation on a substantially vertical axis adjacent to the outlet and with said rotor body closely underlying the deck; means drivingly connecting the rotor body with the power drive means, for rotation of the rotor body in one direction; and a plurality of fingers projecting angularly downwardly from the rotor body, said fingers being inclined oppositely to the direction of rotation of the rotor body so that an object pushed into the outlet toward the cutting element will be deflected downwardly and outwardly away from the cutting element by the fingers, and accumulations of grass in the outlet will be dislodged by the fingers.

4. A lawn mower of the type comprising a cutting element rotatable on a vertical axis, power means by which the cutting element is rotated, and a wheeled carriage having a deck beneath which the cutting element is mounted and a skirt surrounding the cutting element and having an outlet at one side thereof through which grass clippings may be expelled: characterized by a cage-like rotor disposed across the outlet and driven by the power drive means for rotation on a substantially vertical axis, said rotor having a body portion underlying the deck and having a plurality of fingers projecting angularly downwardly from the body portion and inclined at an angle away from the direction of rotation of the rotor so as to deflect downwardly and outwardly any object pushed into the outlet toward the cutting element, said fingers also serving to dislodge accumulations of grass clippings which might block the outlet.

5. The lawn mower of claim 4, further characterized by the fact that said fingers of the rotor are substantially resilient.

6. In a lawn mower of the type comprising a cutting element rotatable on a vertical axis, power drive means for the cutting element, and a wheeled carriage having a deck beneath which the cutting element is mounted and a skirt surrounding the cutting element and having an outlet at one side of the skirt through which grass clippings may be expelled, means for preventing clogging of said outlet with grass clippings and for preventing a person from contacting the cutting element through said outlet, said means comprising: a barrier across the outlet comprising a plurality of spaced fingers, movably mounted upon the carriage and operable by their movement to keep the outlet clear; and a driving connection between the power drive means and said barrier for so moving the fingers.

References Cited in the file of this patent

UNITED STATES PATENTS

| | | |
|---|---|---|
| 2,664,686 | Witt | Jan. 5, 1954 |
| 2,719,396 | Morris et al. | Oct. 4, 1955 |